(12) United States Patent
Theobald

(10) Patent No.: US 9,471,062 B1
(45) Date of Patent: Oct. 18, 2016

(54) VEHICLE OPERATING METHOD AND SYSTEM

(71) Applicant: Daniel Theobald, Somerville, MA (US)

(72) Inventor: Daniel Theobald, Somerville, MA (US)

(*) Notice: Subject to any disclaimer, the term of this patent is extended or adjusted under 35 U.S.C. 154(b) by 0 days.

(21) Appl. No.: 14/586,228

(22) Filed: Dec. 30, 2014

(51) Int. Cl.
G05D 1/00 (2006.01)
G05D 1/02 (2006.01)

(52) U.S. Cl.
CPC .................................. G05D 1/021 (2013.01)

(58) Field of Classification Search
CPC .. G05D 1/0255; G05D 1/027; G05D 1/0272; G05D 1/0278; G05D 1/21; G05D 2201/0216
USPC ......................................................... 701/23
See application file for complete search history.

(56) References Cited

U.S. PATENT DOCUMENTS

| | | | | |
|---|---|---|---|---|
| 8,209,074 B2* | 6/2012 | Sonoura | ................ | G05D 1/024 701/23 |
| 8,326,469 B2* | 12/2012 | Phillips | ................ | G05D 1/0088 701/2 |
| 8,396,611 B2* | 3/2013 | Phillips | ................ | G05D 1/0033 700/245 |
| 8,843,244 B2* | 9/2014 | Phillips | ................ | G05D 1/0038 701/2 |
| 8,954,193 B2* | 2/2015 | Sandin | ................ | G05D 1/028 700/245 |
| 9,043,952 B2* | 6/2015 | Sandin | ................ | G05D 1/0255 |
| 9,056,676 B1* | 6/2015 | Wang | ................ | B64F 1/00 |
| 2007/0198145 A1* | 8/2007 | Norris | ................ | H04L 67/12 701/23 |
| 2007/0213892 A1* | 9/2007 | Jones | ................ | A47L 11/00 701/23 |
| 2008/0039974 A1* | 2/2008 | Sandin | ................ | G05D 1/028 700/258 |
| 2010/0049391 A1* | 2/2010 | Nakano | ................ | G05D 1/024 701/23 |
| 2010/0082195 A1* | 4/2010 | Lee | ................ | B62D 15/025 701/25 |
| 2012/0173070 A1* | 7/2012 | Schnittman | ................ | G05D 1/0227 701/26 |
| 2014/0025230 A1* | 1/2014 | Levien | ................ | A61M 5/20 701/2 |
| 2014/0025235 A1* | 1/2014 | Levien | ................ | G05D 1/00 701/3 |
| 2014/0136414 A1* | 5/2014 | Abhyanker | ................ | G06Q 50/28 705/44 |
| 2014/0156134 A1* | 6/2014 | Cullinane | ................ | B60W 30/00 701/23 |
| 2015/0134178 A1* | 5/2015 | Minoiu-Enache | .. | B60W 50/035 701/23 |
| 2015/0234385 A1* | 8/2015 | Sandin | ................ | G05D 1/0265 700/258 |
| 2015/0353206 A1* | 12/2015 | Wang | ................ | B64F 1/00 244/114 R |

* cited by examiner

Primary Examiner — Atul Trivedi
(74) Attorney, Agent, or Firm — Albert J. Brunett

(57) ABSTRACT

A method and system for operating at least one vehicle are provided. The method comprises providing a multi-mode vehicle having at least two modes of operation, the first mode of operation being fully autonomous and the second mode of operation relying on one or more markers positioned within the environment at least in order to enable the vehicle to navigate within an environment. The method further comprises enabling the multi-mode vehicle to operate in either the first mode of operation, the second mode of operation or both modes of operation simultaneously depending on the particular environment desired to reduce manufacturing variability while accommodating a wider variety of environments.

1 Claim, 4 Drawing Sheets

VEHICLE OPERATING METHOD AND SYSTEM

BACKGROUND OF THE INVENTION

1. Field of the Invention

The present invention generally relates to methods and systems for operating vehicles.

2. Background Information

Vehicles may be used for a variety of purposes. Often times, however, these vehicles can only operate in one mode of operation. This may increase manufacturing variability and may not allow for vehicles to operate in different types of environments.

SUMMARY OF THE INVENTION

A method and system for operating at least one vehicle are provided. The method comprises providing a multi-mode vehicle having at least two modes of operation, the first mode of operation being fully autonomous and the second mode of operation relying on one or more markers positioned within the environment at least in order to enable the vehicle to navigate within an environment. The method further comprises enabling the multi-mode vehicle to operate in either the first mode of operation, the second mode of operation or both modes of operation simultaneously depending on the particular environment desired to reduce manufacturing variability while accommodating a wider variety of environments.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

Figure 1:
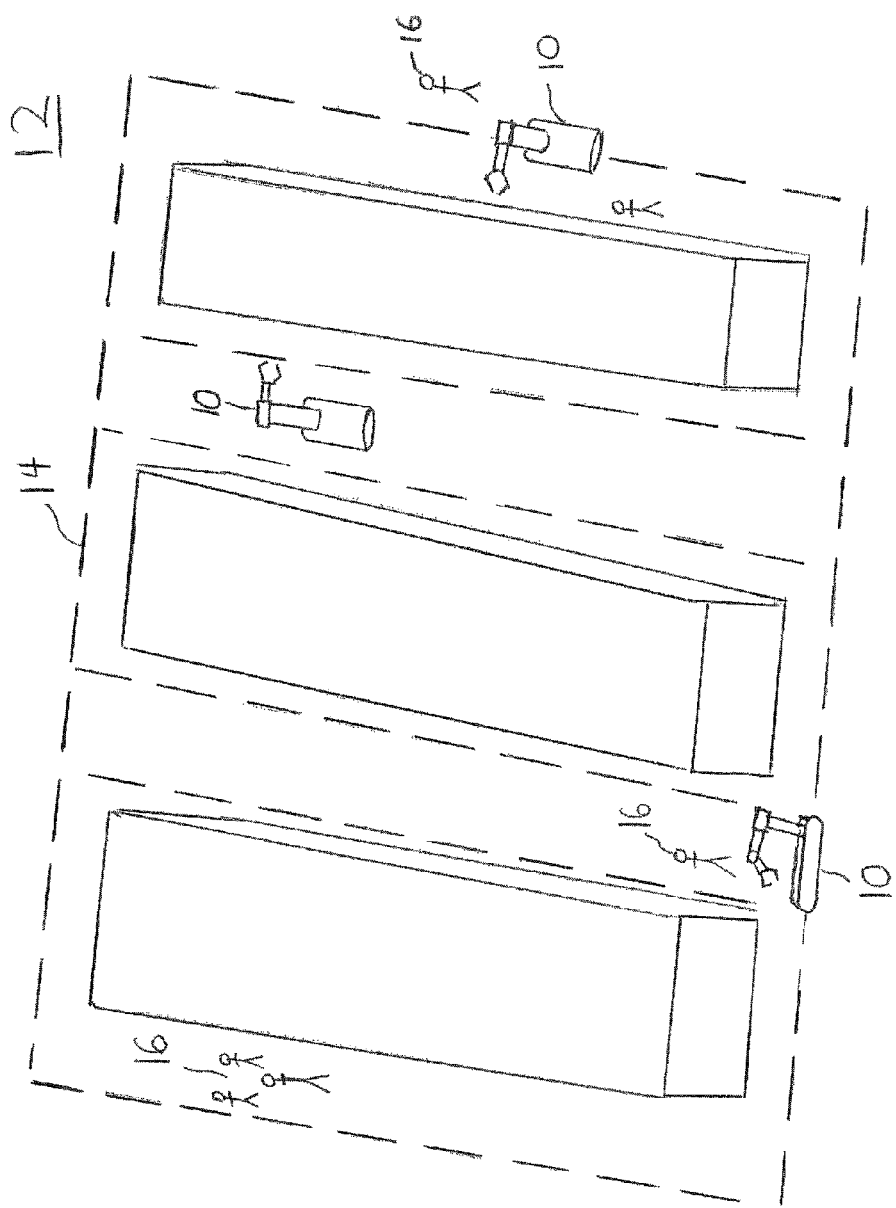
FIG. 1 generally illustrates vehicles in an environment in accordance with one embodiment of the invention.

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention is generally related to methods and systems for operating vehicles. In the context of this invention, the term "vehicle" may refer to a car, van, truck, boat, motorcycle, scooter, trailer, train, robot, plane, drone, aerial vehicle, submersible vehicle, or any other type of vehicle or the like.

The vehicle in accordance with the invention may also include construction equipment, military vehicles, warehouse or factory machinery, industrial equipment, logistic support vehicles, or the like. The vehicle may of course vary and depend on the application and operating environment.

The vehicle in accordance with the invention may also be powered by a variety of power sources. The vehicle may be an electric vehicle, a gasoline hybrid vehicle, a propone vehicle, a fuel cell vehicle or the like. It is to be understood, however, that the invention is not to be limited by the power used to provide movement to the vehicle, the type of vehicle or the environment within which the vehicle may be used.

The features of the invention may also be implemented with robots in various applications. For example, robots may be used to provide logistics support in environments such as warehouses.

Robots may also transport items within retail establishments such as grocery stores, clothing stores, or the like. In this application, a robot may stock shelves or displays with certain items.

Robots may also transport items throughout academic campuses such as food items to dining halls or dormitories. Robots may also provide support at construction sites, manufacturing facilities, package delivery, military bases, prisons, airports, train, boat or bus stations or the like. In the hospitality industry robots may transport items to and from guest rooms.

Applicant also supplies robots to healthcare facilities. In these applications robots may travel within the healthcare facility to transport items such as medicine, pillows, blankets, files, or the like.

In addition to providing logistics support, these types of vehicles may serve security purposes. For example, if a person is detected in a restricted area, or if there is an unusual amount of people at a certain location, the vehicle may travel to investigate.

Regardless of the vehicle used, the vehicle in accordance with the invention may be a multi-mode vehicle having at least two modes of operation. The first mode of operation being fully autonomous and the second mode of operation relying on one or more markers positioned within the environment at least in order to enable the vehicle to navigate within an environment.

In the context of the invention, the term "fully autonomous" may refer to a vehicle that can perform one or more tasks without, for example, any outside control and/or intervention. A fully autonomous vehicle may navigate within an environment without relying on markers and without instructions (e.g., vectors, commands) from a human operator.

In the context of the invention, the term "marker" may refer to any object or items positioned in the environment to at least assist the vehicle in navigating within the environment. For example, these markers may include guide lines in the form of tape, paint, magnets or the like that are positioned in the environment. The vehicle may follow these guide lines to stay within pre-determined areas of the environment, thereby making collisions with other entities such as humans at least less likely.

These markers may also include wires that are embedded within or otherwise operably positioned on the floor. These wires may transmit a signal to the vehicle, and the vehicle may steer accordingly to follow the wire.

Other types of markers may include reflective tape positioned on the environment ceiling, floor, stationary objects, or even other vehicles. In this configuration, the vehicle may transmit and receive laser signals to and from these markers. Based on the distance from these markers, the vehicle may determine its location and navigate accordingly.

The types of markers mentioned above are merely exemplary. Any other type of marker whether available now or invented hereafter may be used as long as the features of the invention may be accomplished.

The vehicle of the invention can readily switch between at least the two modes of operation mentioned previously. The ability for a vehicle to operate in these different modes may provide a number of advantages.

One advantage is manufacturing flexibility. Some customers may want fully autonomous vehicles while others may want vehicles that rely on markers. Rather than making customized vehicles for each customer, a manufacturer can make the multi-mode vehicles of the invention which may then be adapted to a certain customer's needs.

Another advantage is the accommodation of a wide variety of environments. Often times an environment may not be pre-configured with markers and the inclusion of such markers can be very costly and sometimes prohibitive. The vehicle of the invention may operate in the first mode of operation in basically any environment, even environments without markers.

Similarly, markers may be damaged, removed, or otherwise unreliable. Rather than waiting for markers to be replaced, the vehicle of the invention may simply operate in the first mode of operation. This inevitably reduces vehicle downtime and customer frustration along with potential safety hazards.

People may also be uncomfortable near fully autonomous vehicles due to the risk of collision or the like. People may instead prefer a vehicle to operate in the second mode of operation to potentially reduce the likelihood of collision or merely to give peace of mind. The vehicle of the invention can therefore operate in the second mode of operation if there are people or other entities in the environment.

FIG. 1 generally illustrates one embodiment of the invention in which multi-mode vehicles (hereinafter "vehicle 10") are operating within an environment 12. This environment 12 may be in a facility such as a warehouse, for example, and may include one or more markers 14, illustrated by the dashed lines. It is also contemplated that a warehouse or other environment may have certain areas with markers and certain areas without markers and may include outside environments.

Briefly, in operation, the vehicle 10 may be performing one or more tasks such as transporting items within the environment 12. While performing these tasks, the vehicle 10 may operate in the first mode, in which the vehicle 10 is fully autonomous and does not follow or rely on the markers 14. Or, the vehicle 10 may operate in the second mode, in which the vehicle 10 relies on the markers 14 to navigate within the environment 12.

The vehicle 10 may readily switch between operating modes, either autonomously or if instructed by an operator such as a person 16. In certain situations the first mode may be desired (e.g., no markers in the environment). In other situations the second mode may be desired (e.g., if there are people 16 or other entities near the vehicle 10).

The vehicle 10 may also operate in both the first and second modes simultaneously. For example, the vehicle 10 may not require any outside instructions or assistance to navigate within the environment, but may periodically make sure it is following a certain path indicated by the markers 14.

Figure 2:
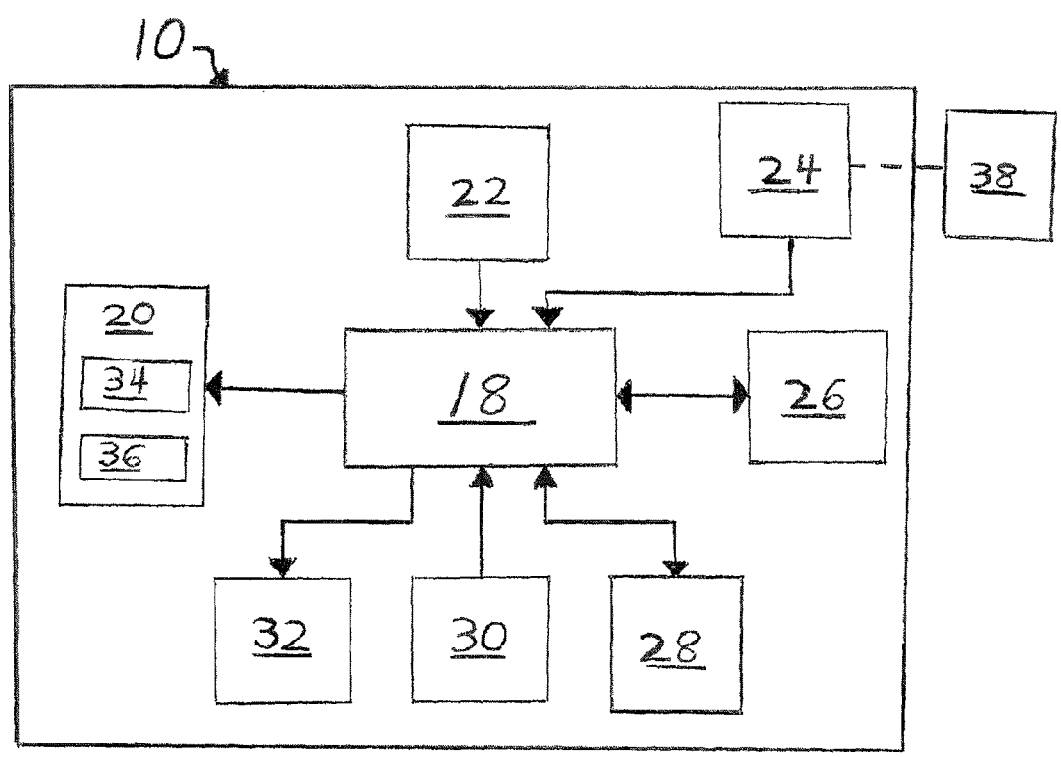
FIG. 2 generally illustrates a block diagram of a vehicle in accordance with one embodiment of the invention.

FIG. 2 generally illustrates a block diagram of the vehicle 10 in accordance with one embodiment of the invention. The vehicle 10 may include a control device 18 implemented using hardware or a combination of hardware and software to perform any necessary calculations and to control operation of the vehicle 10. The control device 18 may include one or more processing devices, analog and/or digital circuitry, and be in operable communication with other components such as a manipulator system 20, sensor system 22, receiver element 24, memory 26, an interface 28, a power source 30, and a mobility platform 32.

The manipulator system 20 may interact with or otherwise manipulate items in the environment. The manipulator system 20 may include at least one arm member 34 configured with an end effector 36 such as a hand member or other gripping device such as a suction device, an electromagnet, or any other device whether available now or invented hereafter.

The sensor system 22 may include any type of sensor device that can gather information regarding the environment surrounding the vehicle 10, such as the information regarding the markers 14 and people 16 or other entities. For example, the sensor system 22 may include the cameras described in detail in applicant's allowed patent application Ser. No. 12/626,990, entitled "System for Providing Camera Views" the disclosure of which is hereby incorporated by reference.

The sensor system 22 may also include global positioning system (GPS) sensors, 3D cameras (e.g., LIDAR), infrared cameras, stereoscopic cameras, inertial sensors, odometric sensors, radar, electro-acoustic transducers (microphones), or other types of devices that assist the vehicle 10 in surveying and navigating within its environment. The number of, type of, and positions of the sensor devices of the sensor system 22 may vary as long as the features of the invention can be accomplished.

These types of sensor devices may also be positioned remotely from the vehicle 10. For example, sensor devices may be operably positioned throughout the environment 12 (e.g., such as on shelves in a warehouse, if applicable).

These remote sensor devices may gather information regarding entities in the environment 12, and that information may be communicated to the receiver element 24 via a central control device 38. The control device 18 can then operate the vehicle 10 accordingly (i.e., either in the first or second modes of operation, or a combination of the two modes).

To gather information regarding the presence, location, and movement of people or other entities, the vehicles may, in one embodiment, rely on applicant's advanced computer vision and analysis tools. These tools may include those described in applicant's pending application Ser. No. 14/264,289 entitled, "Method of Operating a Sensor System," filed Apr. 29, 2014, the contents of which are incorporated by reference.

Either the vehicle 10 or the central control device 38 may use model-free methods which may include background subtraction and motion segmentation which rely on changes (e.g., pixel differentiation) to identify regions in images that correspond to certain entities such as people, animals, boxes, or other items. Model-based methods may also be used, which employ off-line trained entity detectors for certain entities as well as different appearances (e.g., due to different viewpoints, occlusion) of the entities.

If humans or other entities are detected in the environment (such that they are at risk of being contacted by the vehicle 10), the control device 18 may autonomously switch to the second mode of operation. The vehicle 10 may then travel within the environment according to the markers 14 to essentially stay within a pre-determined path. The vehicle 10 may continuously determine whether there are humans or other entities in the environment and may switch between the operation modes as appropriate.

The receiver element 24 may receive commands regarding the vehicle's operation via a wireless connection from the central control device 38. These commands may be issued autonomously or by an operator.

For example, if a facility is expecting people in the environment (such as employees or other visitors), a remote operator may instruct all vehicles to operate in the second mode of operation via the central control device 38. The operator may similarly instruct the vehicle or vehicles to operate in the first mode of operation after the group of people leave the environment. The vehicles 10 may be similarly configured to operate in certain modes based on time of day, day of week, or the like.

The memory 26 may be configured to store software such as instructions for execution by the control device 18. The memory 26 may include volatile and/or non-volatile memory, and may also be configured to store information regarding the vehicle's surrounding environment such as where humans or other entities are commonly located or the like.

An interface 28 may be configured as part of the vehicle 10 and directly receive instructions or commands from an operator. The interface 28 may include an input/output (I/O) device such as a display screen or a touch pad, in which an operator may input task assignments and/or instructions regarding modes of operation.

The power source 30 may be configured to supply power to the control device 18 and other components of the vehicle 10. The power source 30 may include, for example, a battery or a series of batteries, rechargeable batteries, battery packs, or the like.

The mobility platform 32 enables movement of the vehicle 10, at least in the first mode of operation. The mobility platform 32 may include sets of wheels, motorized track portions, or the like, and may depend on the configuration of the vehicle 10.

Figure 3:
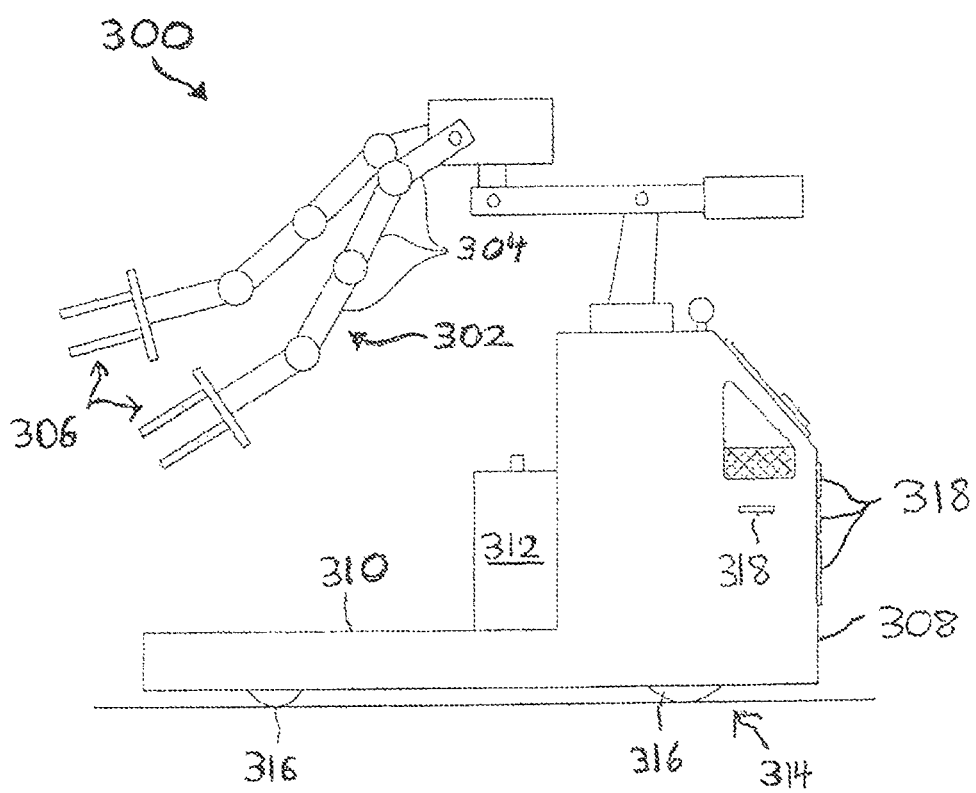
FIG. 3 generally illustrates a vehicle in accordance with one embodiment of the invention.

FIG. 3 generally illustrates a side view of a vehicle 300 in accordance with one embodiment of the invention. In this embodiment, the vehicle 300 may include one or more manipulator systems 302 each with one or more arm members 304. Each manipulator system 302 may be electronically, hydraulically, pneumatically and/or mechanically actuated and may include an end effector device 306 such as a gripping device, a suction device, an electromagnet, a winch, a clasp, or the like.

If the vehicle 300 includes hydraulically actuated devices, for example, these devices may take advantage of the "passive compliance" technology discussed in applicant's allowed application Ser. No. 12/705,995, entitled "High Efficiency Actuator Method, System, and Apparatus," the contents of which are incorporated by reference. This technology essentially provides arm members or the like with a certain amount of "give" or flexibility in the event there is contact between the vehicle 10 and a person or other entity.

The vehicle 300 may also include a base portion 308 containing the necessary electrical components, mechanical components, connections, and control devices for the vehicle's operation. The base portion 308 may also include a substantially flat portion 310 for supporting an item 312 or items, and also a mobility platform 314 in the form of wheels 316 for enabling movement of the vehicle 300. The vehicle 300 also includes a plurality of sensor devices 318 for gathering information regarding the environment.

Figure 4:
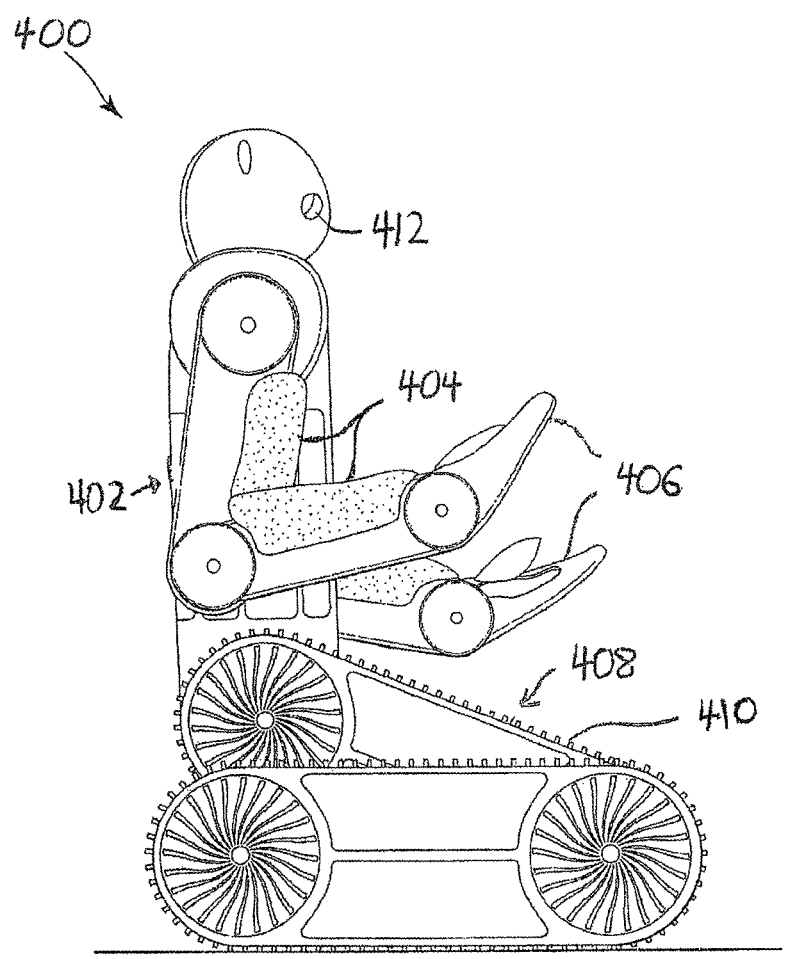
FIG. 4 generally illustrates a vehicle in accordance with another embodiment of the invention.

FIG. 4 generally illustrates a side view of a vehicle 400 in accordance with another embodiment of the invention. In this embodiment, the vehicle 400 may similarly include manipulator systems 402 with arm members 404. Each manipulator system 402 may be electronically, hydraulically, pneumatically and/or mechanically actuated and may include an end effector device 406 such as a gripping device, a suction device, an electromagnet, a winch, a clasp, or the like.

In this embodiment, the vehicle 400 may include a mobility platform 408 in the form of motorized (e.g., robotic and multi-linkage) track systems 410. The mobility platform 408 (or 314 of FIG. 3) may also or alternatively include one or more propulsion devices with configurations other than those described above and illustrated in the drawings. The vehicle 400 may also include sensor devices 412 to gather information regarding the environment.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure

What is claimed is:

1. A method of operating a mobile robot in an environment, comprising:
    providing a mobile robot capable of movement about a designated area as both a fully autonomous mobile robot in a first mode of operation, an automated guided vehicle in a second mode of operation that relies on markers within the environment and movement in at least a portion of both the first and second modes of operation at the same time while being capable of autonomously switching back and forth between the first and second modes of operation and both modes of operation without any human intervention as desired as the mobile robot moves within the environment to accomplish one or more tasks;

operating the mobile robot for movement in only the first mode of operation when there no markers positioned in the environment, the second mode of operation when there are markers positioned in the environment and both the first and second modes of operation simultaneously when there are some markers in the environment but additional guidance is needed from the first mode of operation for the robot to move more quickly and safely in the environment; and switching autonomously without any human intervention between the first and second modes of operation as well as both modes of operation at the same time as the conditions change within the environment to provide movement to the mobile robot within the environment.

* * * * *